United States Patent
Clarke

(10) Patent No.: US 10,599,301 B2
(45) Date of Patent: Mar. 24, 2020

(54) PANEL WITH A TWO-HAND OPERATED USER INTERFACE FOR A MULTI-ROOM MEDIA PLAYER

(71) Applicant: Bang & Olufsen A/S, Struer (DK)

(72) Inventor: Lyle Bruce Clarke, Lunderskov (DK)

(73) Assignee: BANG & OLUFSEN A/S, Struer (DK)

( * ) Notice: Subject to any disclaimer, the term of this patent is extended or adjusted under 35 U.S.C. 154(b) by 89 days.

(21) Appl. No.: 15/555,478

(22) PCT Filed: Mar. 4, 2015

(86) PCT No.: PCT/DK2015/050044
§ 371 (c)(1),
(2) Date: Sep. 1, 2017

(87) PCT Pub. No.: WO2016/138901
PCT Pub. Date: Sep. 9, 2016

(65) Prior Publication Data
US 2018/0107356 A1 Apr. 19, 2018

(51) Int. Cl.
| | |
|---|---|
| *G06F 3/048* | (2013.01) |
| *G06F 3/0484* | (2013.01) |
| *H04S 7/00* | (2006.01) |
| *G06F 3/0362* | (2013.01) |
| *G06F 3/0488* | (2013.01) |

(52) U.S. Cl.
CPC .......... *G06F 3/0484* (2013.01); *G06F 3/0362* (2013.01); *G06F 3/0488* (2013.01); *H04S 7/301* (2013.01); *G06F 2203/04802* (2013.01); *H04R 2227/005* (2013.01)

(58) Field of Classification Search
CPC ..... G06F 3/0484; G06F 3/0362; G06F 3/0488
See application file for complete search history.

(56) References Cited

U.S. PATENT DOCUMENTS 9,104,304 B2 * 8/2015 Yu .................. G06F 3/0488
2012/0137190 A1 5/2012 Panteleev et al.
(Continued)

FOREIGN PATENT DOCUMENTS

WO 2013137190 A1 9/2013

OTHER PUBLICATIONS

Controlling an iPod (Year: 2007).*
(Continued)

*Primary Examiner* — David E Choi
(74) *Attorney, Agent, or Firm* — Ice Miller LLP

(57) ABSTRACT

An apparatus for controlling a plurality of devices with loudspeaker located in various rooms of a dwelling. The apparatus comprises a panel (1) with first user interface (2) and a second user interface (3) arranged side by side. The first user interface (2) comprises an interactive touch screen display with an indicator (11) for each room that contains an electronic device. The second user interface (3) comprises an adjustment element, for example a rotating wheel or a finger track indicator (8), for adjusting the audio level in a room in response to a correspondingly finger moving action on the second user interface (3). The audio level in a room is adjusted by the user holding one finger tip on the indicator (11) for that room while another finger is simultaneously moved on the second user interface (3).

9 Claims, 6 Drawing Sheets

(56) References Cited

U.S. PATENT DOCUMENTS

| | | | |
|---|---|---|---|
| 2015/0261378 A1* | 9/2015 | Lee ................... | G06F 3/0416 |
| | | | 715/765 |
| 2016/0073250 A1* | 3/2016 | Moore ................ | H04W 48/16 |
| | | | 370/338 |
| 2016/0078593 A1* | 3/2016 | Mesguich Havilio .... | G06T 3/40 |
| | | | 345/668 |
| 2018/0107356 A1* | 4/2018 | Clarke .................. | H04S 7/301 |

OTHER PUBLICATIONS

Sonos User Guide (Year: 2008).*
CR200 (Year: 2009).*
European Patent Office, International Search Report, dated Nov. 18, 2015.
European Patent Office, Written Opinion of the International Searching Authority, dated Nov. 18, 2015.

* cited by examiner

PANEL WITH A TWO-HAND OPERATED USER INTERFACE FOR A MULTI-ROOM MEDIA PLAYER

CROSS REFERENCE TO RELATED APPLICATION

The present application is a U.S. national stage of, and claims the priority benefit of, International Patent Application Serial No. PCT/DK2015/050044, filed Mar. 4, 2015, the contents of which are hereby incorporated in its entirety into the present disclosure.

FIELD OF THE INVENTION

The present invention relates to a controller with a user interface to support selecting media files for rendering and control of audio volume level for loudspeakers in several rooms of a dwelling.

BACKGROUND OF THE INVENTION

Multimedia electronics, typically, have a high degree of versatility with respect to sorting of piece of music or videos as well as to the technical features of the electronics. Accordingly, user-interfaces become increasingly complex and difficult to operate. Ongoing efforts are made to simplify such user interfaces in the direction of increased user-friendliness and intuitive operation. However, the growing number of technical features puts high demands on the design of user interfaces, and the latter is typically not the highest investments made by the suppliers of consumer electronics. There is therefore a steady demand for improvement.

For multimedia systems in homes, several suppliers provide user interfaces in special dedicated hand held remote controls or as software applications for cell phones and tablet computers, so called apps, where a single user interface can be used to regulate the audio volume and other parameters in various rooms of the house. Although, the number of remote controls has been reduced to a single unit, the user interface is seldom simplified by the mere concentration of more devices on a single user interface.

DESCRIPTION/SUMMARY OF THE INVENTION

It is therefore the objective of the invention to provide an improvement in the art. It is especially an objective to improve user-friendliness of a remote control for a plurality of multimedia devices in various rooms of a dwelling. It is a further objective to provide a remote control that is intuitively easy to operate.

This objective is achieved with an apparatus as described in the following for controlling a plurality of loudspeakers located in various rooms of a dwelling. Although, the apparatus is especially useful in a dwelling, the apparatus is also suitable and useful for buildings with other types of rooms, for example schools, factories, or offices. However, for sake of simplified exemplification, but without taking the generality of the invention as such, the invention will be presented as functioning in a dwelling.

In simple terms, the apparatus comprises a panel with first user interface and a second user interface arranged side by side. The first user interface comprises an interactive touch screen display with a visual indicator for each room that contains an electronic device. The second user interface comprises an adjustment element, for example a rotating wheel or an indicated sliding track, for adjusting the audio level in a room in response to a correspondingly finger moving action on the second user interface. The audio level in a particular room is adjusted by the user holding one finger tip on the indicator for that particular room while another finger is simultaneously moved on the second user interface.

The dwelling comprises a plurality of rooms of which all or some are equipped with an electronic device. An electronic device in a room comprises at least one loudspeaker, for example several loudspeakers, and a wireless transceiver, typically WiFi transceiver, as well as a digital memory and digital processor.

The electronic devices in the various rooms, as part of a home multimedia system, are wirelessly connected to the apparatus for exchange of digital wireless signals between the electronic devices and the apparatus, which is also part of the multimedia system. The digital wireless signals comprise digital command data for start and stop for playing through the loudspeakers in each of the various rooms that are equipped with the corresponding electronic devices. The digital wireless signals also comprise digital control data for audio level adjustment and status data for connectivity and play status. Further features are typically contained in the digital data, such as adjustment of the sound quality. In some embodiments, the electronic devices in the rooms comprise a database with multimedia content for playing in the room. In other embodiments, the electronic devices receive the multimedia content through the WiFi system along with the other digital signals or receive the multimedia content by streaming from the Internet.

Optionally, some of the electronic devices are configured only to receive digital audio data from the apparatus as a central device or from the Internet directly, while others contain, alternatively or in addition, an autonomous source of digital audio data, such as a digital database, for example RAM, hard disc, compact disc, DVD, SD card, or USB memory stick, the list not being exhaustive. As a further option, the electronic devices are able to be selected by the apparatus to be used as audio source for feeding other electronic devices with audio signals. The audio signals are optionally coupled to video signals for those electronic devices that are able to receive and display video signals and not only play sound signals.

The apparatus comprises a terminal with a panel that, in turn, comprises a first user interface and a second user interface arranged side by side, typically with a distance of a few cm in between, for example 1 to 10 cm. The first interface comprises an interactive touch screen display that gives visual indication of the actual mode of operation of the home multimedia system and comprises a set of functions that are operated by the user as a result of pointer actions by a finger.

The term pointer action by a finger is used here to define a touching by the tip of a finger on the surface of the user interface. It is also possible to use several finger touches on the user interface if correspondingly programmed. Such pointer action can be a tapping, holding or sliding pointer action, where the finger is shortly tapped on the surface of the interactive touch screen display or placed and held on the surface, or where the finger is touching the surface of the display and sliding across a part of the surface.

The position of the finger on the user interface is detected by corresponding detectors, typically by electrostatic measurements, although a pressure sensitive surface is also possible to use. It is emphasized that the finger pointing action can be substituted by pen pointers that are customary for substituting fingers and which have a tip surface that triggers the detectors in a similar way as a fingertip would do. These pen pointers are also included as possible substitutes to fingers in connection with the present invention. Thus, in those functions where the apparatus is configured for detecting a finger point action, the apparatus is also configured for detecting such pens.

The touch screen display of the first user interface comprises first indicators, wherein each of the first indicators indicates a room that contains an electronic device wirelessly connected to the apparatus. The indicators are potentially given names of the rooms, for example kitchen and bedroom, although the indicators are linked to the respective electronic device rather than the room itself. For example, in principle, a device may be moved from one room to the next and still keep the indicator of kitchen, for example. This correct naming is made by the user once the corresponding electronic device is installed in the room of concern.

The touch screen display is confined by a border, typically the edge of a glass plate on top of the display, and only within the border, the first user interface is provided. In turn, the second user interface is provided outside the border. The second user interface comprises an adjustment element configured for adjusting the audio level in a room in response to a correspondingly pointer moving action on the second user interface by a second finger.

For example, the moving action is a rotation of a wheel or the linear push of a corresponding linearly movable key or lever. Alternatively, the moving action is a sliding action on the surface along a path, for example a linear path or a circular path that is indicated by a track indicator. Such track indicator can be provided by color indication or by different materials. Alternatively or in addition, the path is indicated by a surface modification of the second user interface, for example track indicator in the form of a shallow trench that also gives the user a sensory feedback when sliding a finger along the track indicator. An option is a circular hollow in the surface of the second user interface. A sensor is provided in or under the track indicator and configured for sensing the touch and the movement of a finger on the track indicator. For example, the sensor is an electrostatic capacitance sensor. The sensed signal is fed into a functionally and electronically connected computer processor as part of the apparatus.

The second user interface advantageously has an appearance that is distinctively different from the first user interface. For example, it is made of a different material than the surface of the first interface. Optionally, the second interface does not comprise an alphanumeric interactive display in contrast to the first user interface. For example, it has a surface made of wood or metal, or is made of a material that resembles wood or metal, for example a correspondingly designed polymer surface.

A possible design for the present invention is similar to the multimedia controller that has been marketed by the applicant under the trade name "BeoSound Moment" which comprises a detachable, double-sided controller of which one surface is covered by wood and the opposite side comprises an interactive touch screen display as a first user interface and a second user interface with an aluminium surface into which there is integrated a circular detector for detecting a sliding finger pointer action along a circular path on the surface of this detector. The detector resembles the appearance of a wheel, although the wheel need not be rotating in itself, seeing that an appearance similar to a rotating wheel, for example by a circular shallow trench, is sufficient for the intuition for the user to slide the finger along the circular path.

In order to be intuitive, the volume adjustment as requested by the user's finger or pen moving pointer action on the second user interface is advantageously only initiated by the apparatus when the moving action on the second user interface by the second finger is performed while simultaneously holding a first finger on one or more of the first indicators in the first user interface. Thus, at least two fingers have to be used in order to change the audio volume level. The idea behind this function is that the user places the tip of one finger, for example the pointer finger of the left hand, onto the first user interface at a location that shows an indicator representing a room where the user wishes to change the audio level, and wherein the user without moving the first finger operates the volume adjustment with another finger, typically a finger on the opposite hand. This both handed operation improves the intuitive understanding of the performed operation.

Although the method and apparatus as explained above is used for adjustment of the audio volume, other features may be performed in a similar way, where the second user interface is very simple, for example to a few gesture movements on the second user interface, such as right to left for scrolling backwards, left to right for scrolling forward, up or down to change menus and functions on the first user interface, and a circular motion to adjust the volume up and down, or to adjust the level of other functions, such as bass, treble, equalizing effects, and room sound compensating effects.

For example, the user may place a left hand finger on an icon representing bass adjustment on the first user interface and move a right hand finger on the second user interface in order to adjust the level of bass; likewise for other functions.

The fact that the user is required to place and hold a finger, or likewise a pen, on an indicator on the first user interface while movingly operating a second user interface by second finger eliminates doubts by the user about what is it that the user is actually adjusting. For a multi-functional user interface, this feature facilitates the understanding of the user interface and eases operation thereof.

In further embodiments, the first user interface is configured for grouping the first indicators into user-selected subgroups as a result of pointer actions by a user's finger on the user interface. Once, such subgrouping has been performed, a corresponding subgroup indicator reflects such user-selected subgroup. For changing the volume levels of all the electronic devices in the user-selected subgroup simultaneously, the user has to perform a pointer moving action by the second finger on the second user interface while simultaneously holding a first finger on the subgroup indicator for which the user wishes to change the volume.

Once, a subgroup has been selected by the user, the volume is adjusted relatively for all the devices in the subgroup, although the volume need not be the same in all rooms. For example, a 50% increase of the volume level may increase the volume from a level 2 to 3 in one room and from a level 6 to 9 in another room.

In order for the user to decrease the volume in a single room among the various rooms of the subgroup, the apparatus comprises optionally a further feature that is intuitively easy for the user to understand and operate. In this embodiment, the first interface is provided with first indicators for the various rooms and with a subgroup indicator that supplements the first indicators by showing links between those first indicators that belong to a subgroup; for example there are provided lines of a certain color linking those indicators that belong to a certain subgroup. If the user holds a finger on the subgroup indicator, for example a colored line, while operating the second interface with another finger, the volume of the entire subgroup is adjusted. If, in turn, the user holds a finger only on a first indicator among the first indicators of a subgroup, only the volume of this particular room is adjusted. Thus, the user can select in an easy way either the entire subgroup or the individual room in the subgroup for audio level adjustment, without having to split the subgroup for the individual room adjustment.

Although, the adjustment has been explained with respect to the audio level, it is implicit that the similar method is applied for adjusting the bass, treble, equalizer level, such as loudness, and a room specific sound compensation level. For example, the user may place one finger on a first indicator and a second finger of the same hand on a bass indicator on the first user interface and may, while holding these fingers, operate the second user interface with a finger of the right hand.

Further features and functions can be provided for adjustment by the two handed operation, for example holding a left hand finger on a first indicator on the first user interface and scrolling through various music titles by moving the right hand finger on the second user interface from left to right only. The various music titles would then be displayed on the first interactive user interface, although, in principle, the music title could also be displayed on the second user interface, if this is equipped with a display. However, it is preferred that the only first user interface is used for information display, partly in alphanumeric format and partly as icons and abstract indicators, and is used for programming and corresponding programming feedback, for example subgrouping of rooms/devices, selection of multimedia sources, selection and grouping of desired pieces of music. Especially, a different appearance of the second user interface as compared to the first user interface increases the intuitive operation of the terminal.

The interactive touch screen panel is optionally provided with different operational modes.

One of the modes is a simple touch with various gestures, such as tapping or sliding along the surface with a finger, which is known from typical touch screens, and the functions of which are discussed above for the special case as described.

A further operational mode is detection of a finger in the close proximity of the touch screen but not necessarily touching it. Such mode can be a substitution for the touch mode and will cause the same function to be performed as the same gesture would cause when touching the screen. Alternatively, it is given other functions or limited a to a selection of the available functions. For example in some embodiments, a gesture, such as a linear or tapping gesture across the surface in close proximity of the surface, however, without touching the surface, has a first function, whereas the same gesture during touch causes the apparatus to perform a different function.

A third operational mode is a touch mode where the length of the touch of the finger on the surface causes additional functions. For example, the simple short tap of a finger on the surface causes a certain multimedia source to be selected. A tap of a finger, where the finger is held at the same point for a while, which is longer than a predetermined time length, may not only cause the multimedia source to be selected but cause additional information to be displayed for selection or for the multimedia source specifically or for the corresponding device associated currently with the specific multimedia source.

A fourth mode of operation is a touch mode that is pressure sensitive. By increasing the touch of the finger on the touch screen surface, various modes can be accessed. For example, by the additional increase of pressure above a predetermined pressure level, detected by corresponding pressure sensors, the apparatus is configured to give access to further functions. For example, the increase of pressure shifts the user interface from one level to another level of information. For example, increased pressure results in more detailed information or more detailed modes of operation than given at lower pressure of the finger. This, way, the user gets the impression of the pressure resembling a zoom function. Higher pressure zooms into more detailed layers of information. The pressure sensitivity gives in some embodiments access to multiple levels of information or into different parts of the user interface, dependent on the pressure level.

Taking offset in the above example, the tapping of a finger on the touch screen can be used to select a multimedia source. Holding the finger for a time length of longer than a predetermined limit, for example 1 second or 2 seconds, additional information for the multimedia, for example the previous and next piece of music or the complete number and titles of the sequence on the multimedia source, is given. If increasing the pressure, even further information may be available, for example information not only about the multimedia source but also about the details about the sound level of the associated device, equalizing levels and degrees of room sound compensation. By combining the various modes of a finger in close proximity, a short tap on the surface, a sliding across the surface, and a touch with increasing pressure, a multidimensional mode system is accessible for the user. For example, the change of operational mode due to increased pressure by the user's finger gives the user the intuitive association of diving into deeper information levels.

In some embodiments, pressure sensitive change of mode of operation is also used on the second user interface. For example, a touch gesture along the sliding track with pressure less than a predetermined level increases the volume level, whereas the same gesture with increased pressure above a predetermined level increases the bass level. Further functions can be dependent on various pressure levels on the touch screen display, the second interface or on both.

For example an independent invention, which can be combined with the features explained above is a pressure sensitive touch screen display for a multimedia device, wherein the pressure of a finger touching the surface of the touch screen display causes the touch screen to respond with different functions and/or with different information in dependence on whether the pressure of the finger is below a predetermined level or above a predetermined level. The information is typically related to the multimedia and/or to the device that is playing the multimedia.

For example, this feature is implemented in an apparatus for controlling a plurality of loudspeakers located in various rooms of a dwelling, where each of the various rooms comprises an electronic device with at least one loudspeaker and with a wireless transceiver, wherein the electronic devices are wirelessly connected to the apparatus for exchange of digital wireless signals, the signals comprising digital command data for start and stop of playing of the loudspeakers, as well as control data for audio levels and status data for connectivity and play status; the apparatus comprising a terminal with a panel that comprises a first user interface with an interactive touch screen display with a surrounding border that confines the touch screen display for interactivity by contact with a user's first finger within the border. The touch screen display comprises first indicators each of which indicates a specific room that contains one of the electronic devices that are wirelessly connected to the apparatus.

Optionally, as explained above, also a second user interface is provided, wherein the first and the second user interface are arranged side by side; wherein the second user interface is provided outside the border and comprises an adjustment element configured for adjusting the audio level in such a specific room in response to a correspondingly pointer moving action on the second user interface by a second finger only when in combination with a simultaneous pointer holding action by the first finger on a corresponding first indicator on the first user interface.

SHORT DESCRIPTION OF THE DRAWINGS

The invention will be explained in more detail with reference to the drawing, where FIG. 1 is an illustration of a panel with a first and second user interface;

FIG. 4 illustrates a programming sequence for linking a selection of rooms to form a subgroup, where a) is a default illustration, b) an illustration when linking one room to the central play space, c) an illustration when linking three rooms to the central play space, d) illustrates the user interface indicating a subgroup with three rooms and a central area; e) illustrates an action for adjustment of the audio level of the subgroup;

FIG. 5 illustrates an action and response sequence for changing the volume level in a single room among rooms in a group, where a) illustrates a blurred line-indication for the rooms that are linked to a single subgroup, b) illustrates an indicator for a single room selected among the rooms in the subgroup, and c) shows a visual indication when changing the volume in the single room only.

DETAILED DESCRIPTION/PREFERRED EMBODIMENT

Figure 1:
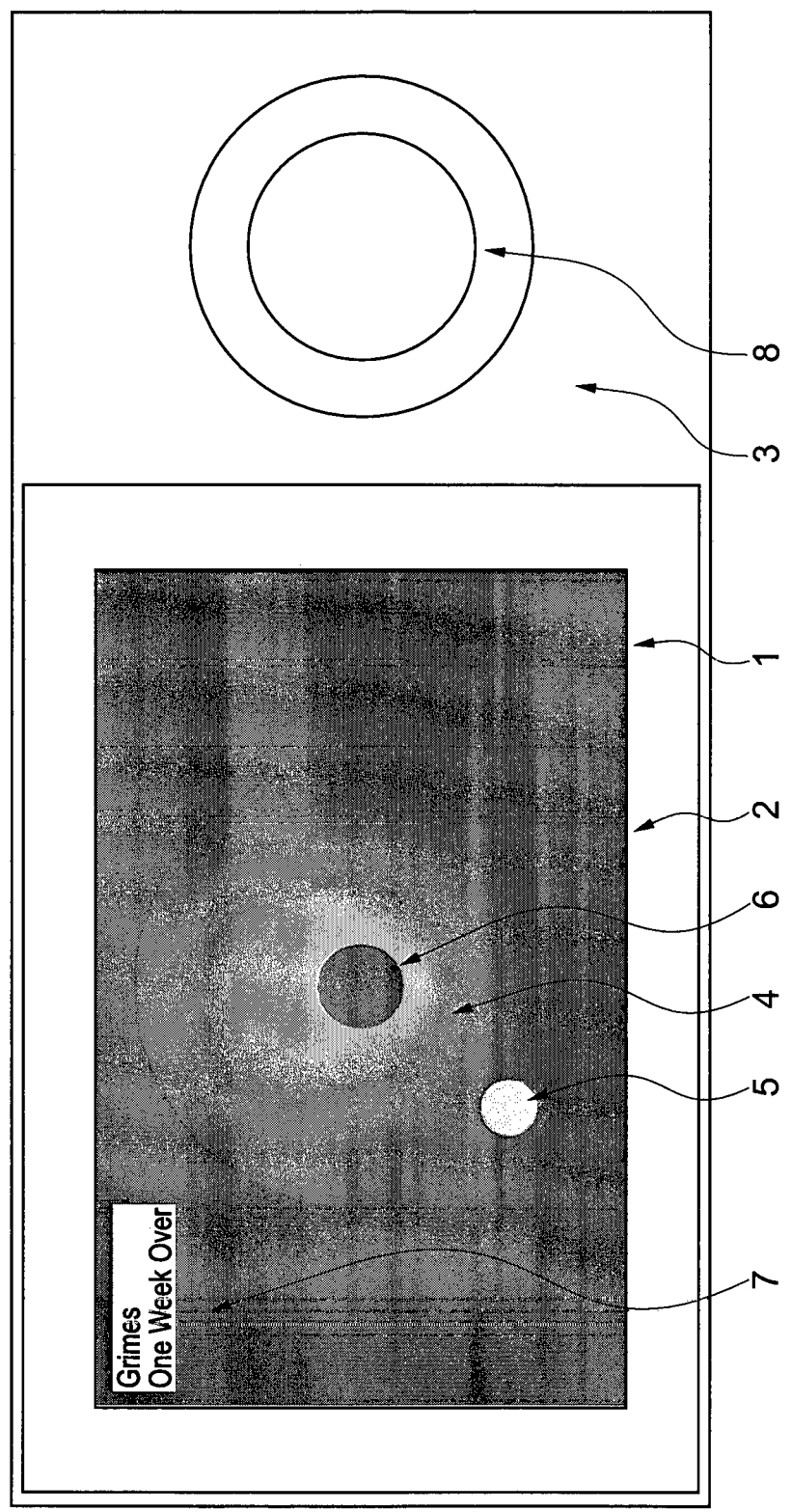

FIG. 1 illustrates a control terminal with a multifunctional user interface configured for controlling multimedia equipment including loudspeakers and multimedia sources that are interlinked digitally and interactively by a common control system. The loudspeakers are provided various rooms, typically in a dwelling. The loudspeakers in different rooms are optionally provided with audio signals from a single source or the loudspeakers in one room are provided with audio signals that are different from the audio signals for the loudspeakers in another room. The control of which loudspeaker is receiving which audio signal and at what sound level is controlled and programmed by the first user interface on the terminal, which will be explained in more detail in the following.

The control terminal 1 comprises a panel with two user interfaces, where the first user interface 2 is an interactive touch screen display, typically with a glass surface, which can toggle between various interface modes. The shown interface mode is commercially known as a "Moodwheel™" marketed by the applicant as part of existing control interfaces. The Moodwheel™ 4 indicates by an indicator 5 the type of music playing, for example happy music at the top, energetic music to the right, blues music at the bottom and relaxing music at the left. The central spot 6 is used for toggling between different controlling modes and feedback modes. The interface 2 also indicates information, for example title and artist, of a piece of music while playing. The same functions are used when multimedia is played instead of a piece of music, for example on a video screen with related loudspeakers. Thus, the term loudspeaker also covers built-in loudspeakers of a television apparatus which are accessible digitally by the control terminal.

The control terminal also comprises a second user interface 3. Whereas the first interface 2 is a touch screen display for displaying graphical icons and/or alphanumeric information for details, the second user interface 3 does not in this embodiment comprise a display with icons or alphanumeric writing. However, it may readily be equipped with a light indicator that changes light in dependence on the mode, but will typically be not made of glass. Examples of materials for the second user interface are metals, particularly stainless steel or aluminium, or wood. The second user interface comprises a circular shaped track indicator 8 that prompts the user to perform a circular gesture motion with a fingertip sliding along the track indicator 8, which resembles the turning of a wheel by the finger. For example, the circular track indicator 8 is formed as a hollow circular trench such that the user can feel the circular shape and easily follow the motion along the circular trench. Typically, the circular track indicator 8 has a diameter of 5-10 cm. If provided as a trench, it has a typical deepness of 1-3 mm and gives the impression of a virtual wheel. It comprises sensors under the circular track indicator 8 to sense the circular moving touch of a finger along the circular path, for example by electrostatic capacitance signals or by measuring pressure on the surface.

As an alternative, the track indicator 8 is substituted by a physical wheel that is operated by the finger.

The second user interface 3, optionally, also has other functions, such as the search for the previous or next piece of music when a sweeping action is performed across the circular track indicator 8 from right to left or left to right.

When the user performs a tapping action with the finger on the central spot 6, the first user interface 2 changes to a second mode. With reference to FIG. 2a-d, The change of mode is indicated by a continuous sequence of circles 9 that gradually decrease in size, resembling a zooming-out movement to give the user the impression that the distance is increased in order to get an overview of the rooms available for playing multimedia, for example music or videos.

The control terminal is functionally connected to the various devices of multimedia equipment, including loudspeakers and multimedia sources, and is programmable for indicating these various devices as being associated with the different rooms, such as kitchen, study room and dining room, as well as the central area, which is the area where the control terminal is located. The functional connection advantageously comprises a WiFi connection, in which case the control terminal and the various devices are equipped with corresponding WiFi transceivers as well as interactive digital electronics for receiving and effectuating the control signals and for responding with status signals back to the control terminal.

Figure 2A:
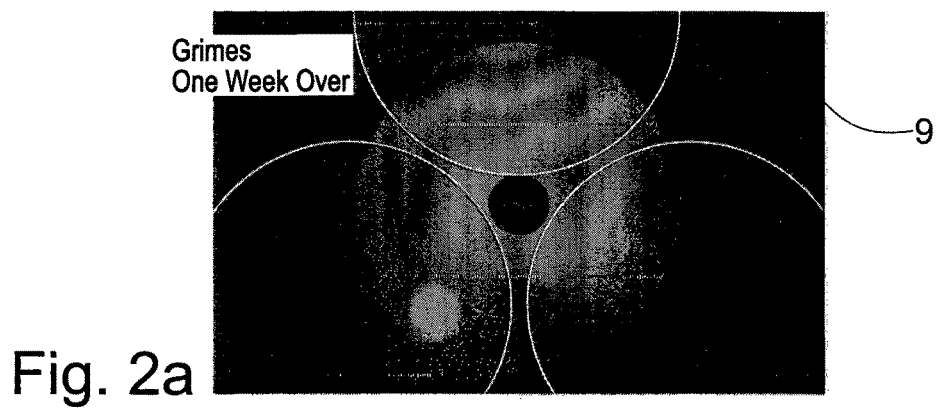
FIG. 2 illustrates a visual indication sequence in an interactive screen of the first user interface when changing mode, where a)-d) are four snapshots during the sequence.
Figure 2B:
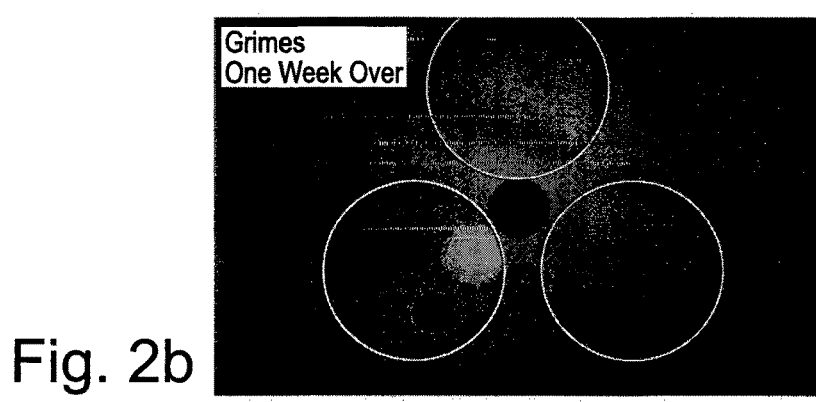
Figure 2C:
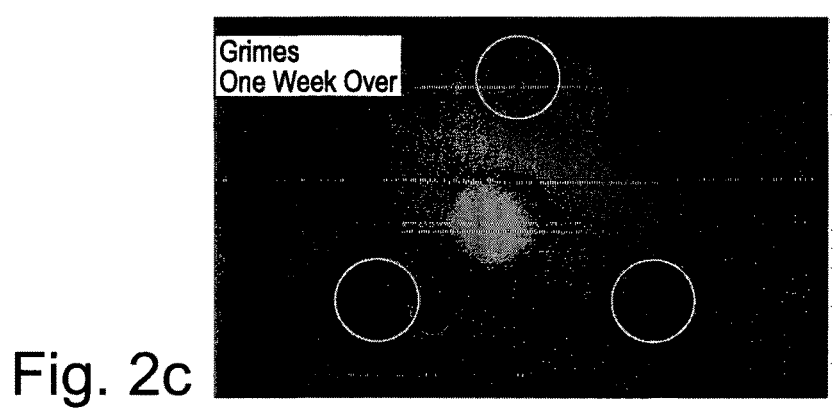
Figure 2D:
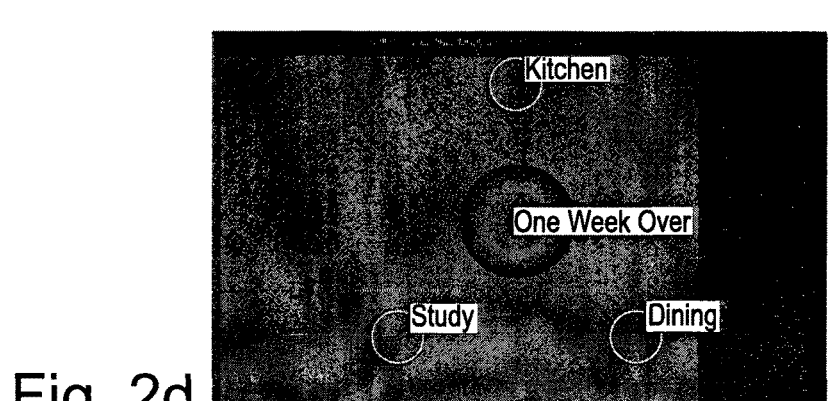
Figure 3:
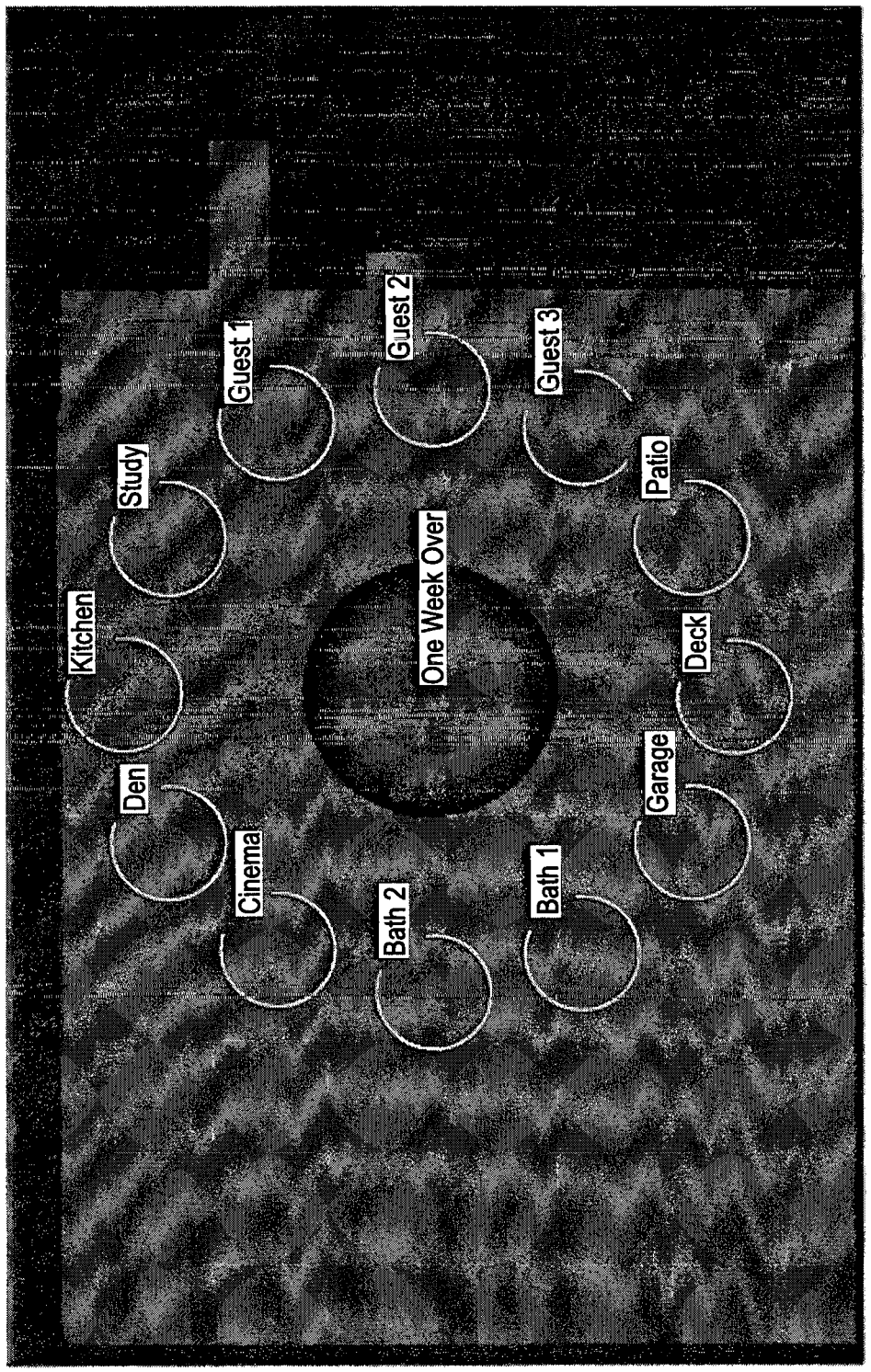
FIG. 3 shows an example of a multiroom representation on the first user interface.

As illustrated in FIG. 2d, three devices are linked interactively to the common control system in the central area, and the three devices are assigned to the three rooms of kitchen, study room and dining room, where a device can comprise more than one loudspeaker in a room. However, the number of devices can be different, such as 1, 2, 4, 5, 6, 7, or more. An example of 12 devices apart from the central area is illustrated in FIG. 3.

The first user interface with the interactive touch screen display is illustrated for group linking in FIG. 4. There are 12 room indicators surrounding the central area, and in the following, the various indicators will be referred to in comparison to a clock with twelve indicators, one for each hour. Correspondingly, the kitchen has the position of 11 o'clock, the porch has the position of 5 o'clock, and the dining room has the position of 9 o'clock.

Figure 4A:
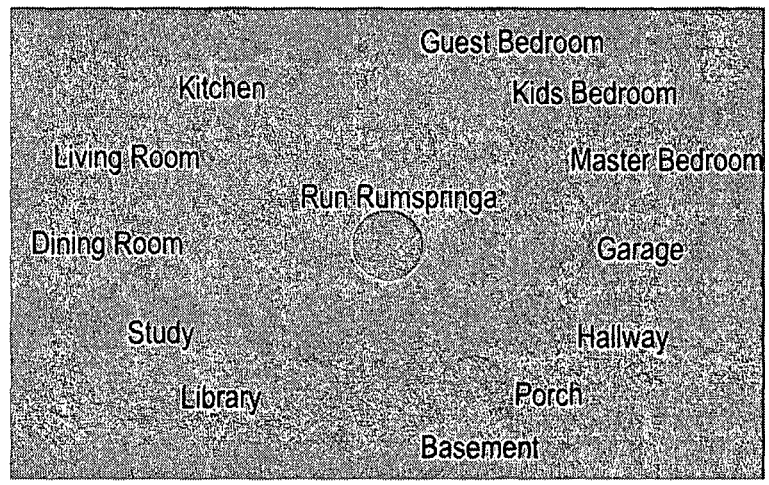
Figure 4B:
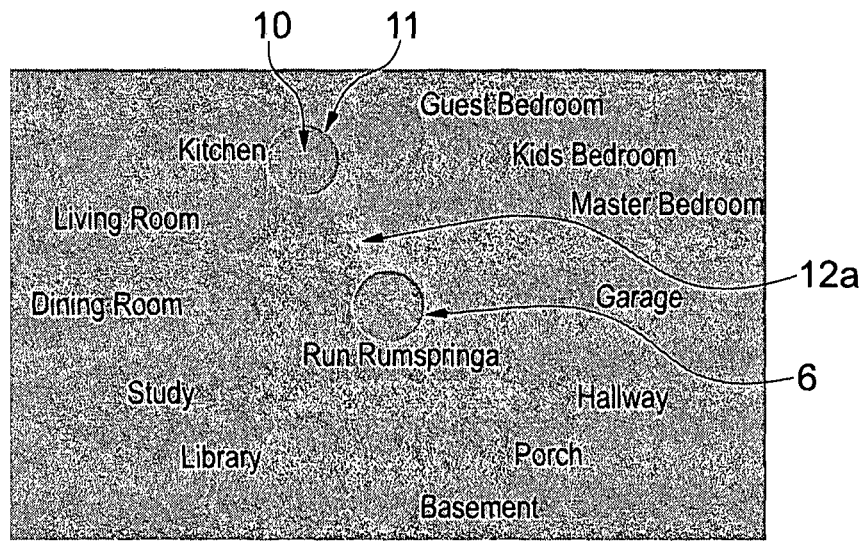
Figure 4C:
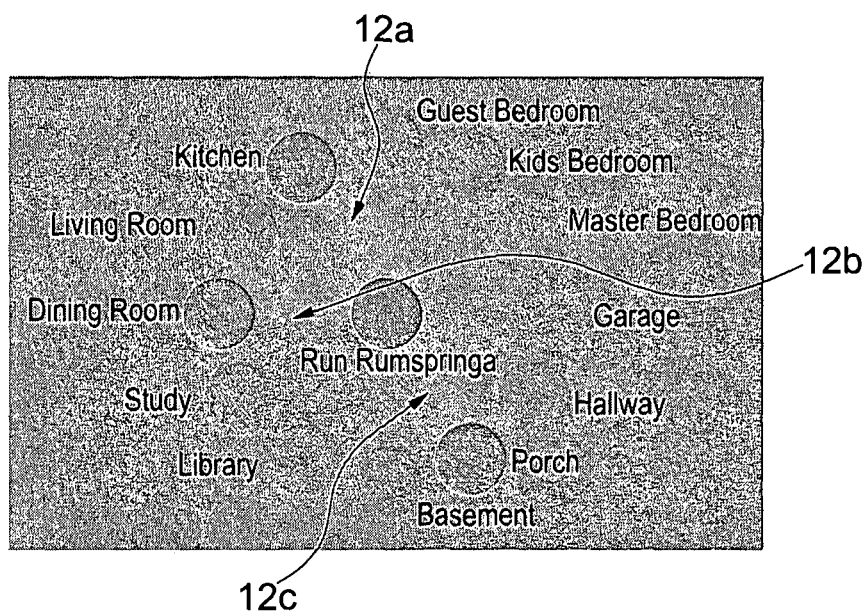
Figure 4D:
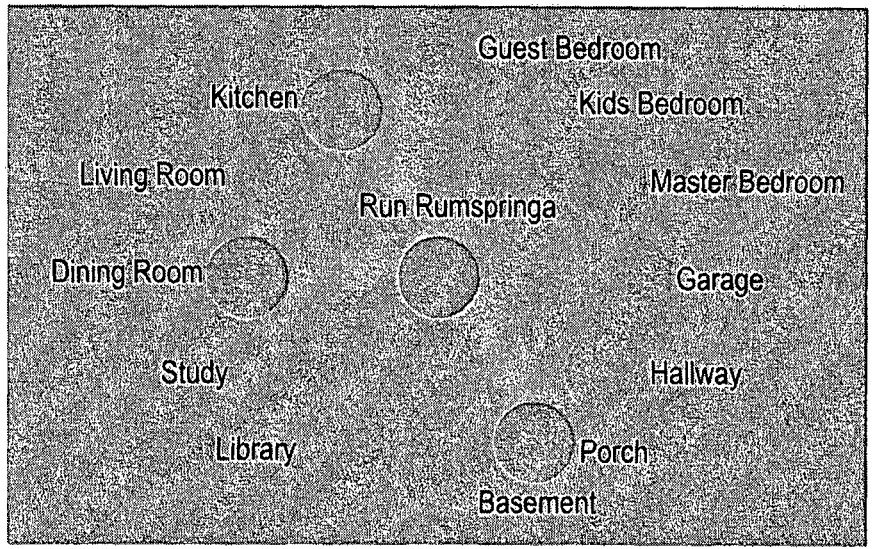

FIG. 4a illustrates the default situation where a dim halo around the central spot indicates the basic starting point in the central area, for example the family room. By tapping on a first room at 11 o'clock position, for example the kitchen, the tapping being indicated by the double circle having smaller circle 10 inside the larger circle 11, the multimedia equipment associated with this room, is getting linked to the group including the central area 6. A blurred line 12a indicates the link between the kitchen circle 11 and the central are 6. Likewise further rooms can be linked to the group, for example the dining room at the 9 o'clock position and the porch at the 5 o'clock position. For both, the tapping is indicated by the double circle. The entire group is indicated by blurred lines 12a, 12b, 12c connecting the three rooms with the central area in the interface, as illustrated in FIG. 4c. The result is then illustrated by the three blurred lines in FIG. 4d.

In some embodiments, the volume in the central area, for example the family room, represented by the central spot, can be adjusted by the above mentioned circular finger gesture on the surface of the second user interface 3. Thus, the one handed operation adjusts only the audio level in the family room. In other embodiments, the user has to point and hold one finger on the central spot while adjusting the audio level on the second user interface 3 by the sliding action of the finger along the track indicator 8.

Figure 4E:
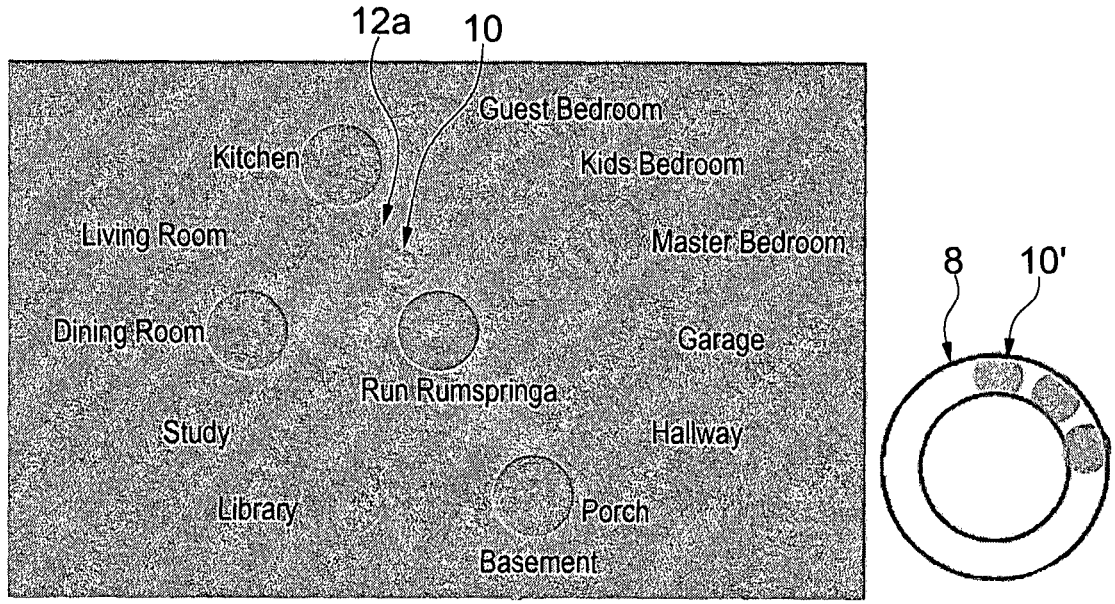

For the adjustment of the audio volume level of the entire subgroup simultaneously, as illustrated in FIG. 4e, the adjustment has to be double handed in that the user has to place one finger on the blurred line (illustrated by the small solid circle 10 on the blurred line 12a) and slide another finger along the track indicator 8 (illustrated by the set 10' of three small solid circle circles on the track indicator 8). In the latter case, there is no doubt for the user, for which devices the volume level is adjusted.

The volume adjustment is performed in relative amounts for all the subgrouped devices, taking into regard that the volume is lower in one room than in another. Thus, a doubling of the volume level in all rooms may maintain the lower adjustment in one room relative to another.

Figure 5A:
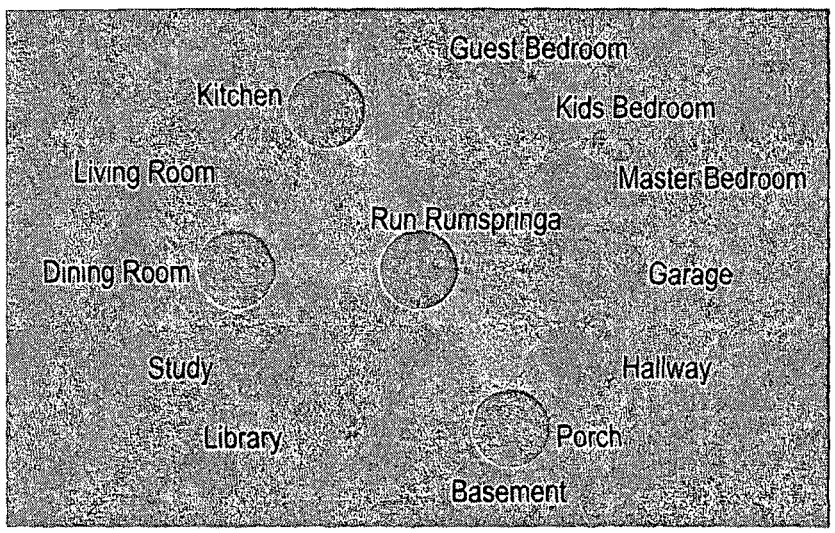
Figure 5B:
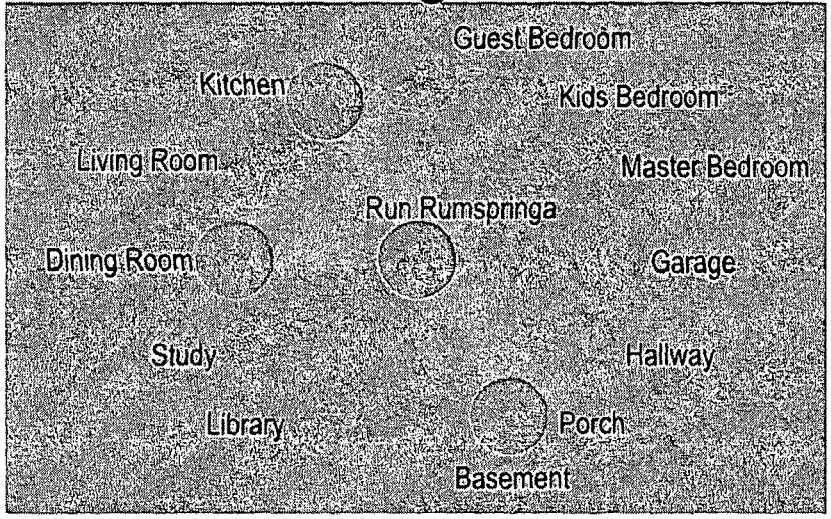

In order to adjust one room in a subgroup individually instead of adjusting the entire subgroup, the user has to place the finger on a single indicator in the subgroup and operate the second user interface 3. This is illustrated in FIG. 5, where FIG. 5a is the starting base for an adjustment of the audio level, FIG. 5b illustrates the holding of the finger on the 9 o'clock indicator, for example for the dining room, and FIG. 5c indicates the operating of the second user interface by a finger sliding along the track indicator 8. In order to visually indicate for the user that the volume level is increased only for this room, the size of the circle at 9 o'clock position increases during the volume increase, when the finger of the user is sliding clockwise along the track indicator 8. Similarly, the size of the 9 o'clock circle would decrease if the audio volume is decreased by sliding the finger on the track indicator 8 counter-clockwise. This visual indication of the audio level is useful for the user, as the room is remote from the central area, for example the family room, where the control panel is located, and the user may not be able to hear the volume increase in the selected room.

In summary, in some embodiment, an audio level adjustment by sliding a finger along the track indicator 8 with a right hand finger without simultaneous touch of a left hand finger on the first, left interface results in only changing the audio volume level in the central area, for example the family room, whereas the simultaneous touch by another finger on a single room indicator changes the audio level in the corresponding single room. Similarly, a simultaneous touch by another finger on the blurred line of a subgroup of rooms changes the level for the entire subgroup The blurred line as group indicator is one example. However, other group indicators can be used, for example solid or stippled connecting lines. For various subgroups, line networks can be used with different colours. Holding a finger on a line with a specific colour would change the volume level for the subgroup in which the room indicators are connected with such coloured lines.

It is also pointed out that the indicators for the rooms need not be placed in a circle around a central area but may as well be presented as a list in a column. In order to link a subgroup of rooms/devices or a single room/device to a specific audio source or multimedia source among a variety of sources, a second column can be provided with second indicators, one for each audio or multimedia source. An indicator for a room or a subgroup of indicators for a subgroup of rooms can then be mutually linked by correspondingly tapping with fingers on the first user interface, as explained above, such that the specific audio source or multimedia source is sending audio signals to the loudspeakers in the respective room or group of rooms. Likewise, other combinations of sources and rooms can be combined and adjusted.

The fact that the user has to operate the two user interfaces simultaneously by two hands allows a simplification of the user interface and is more intuitive for the user than those interfaces where the selection has to be done first and then subsequently an adjustment of the volume has to be performed.

It is pointed out the adjustment of the volume is only one example for a useful grouped or non-grouped adjustment. Instead of the volume level adjustment, a similar procedure can be used for level adjustment of treble, bass, or equalizing functions. Further functions include so-called audio room compensation functions, where the sound profile in the room adjusted in relation to the sound reflection and sound damping properties of the room.

Figure 5C:
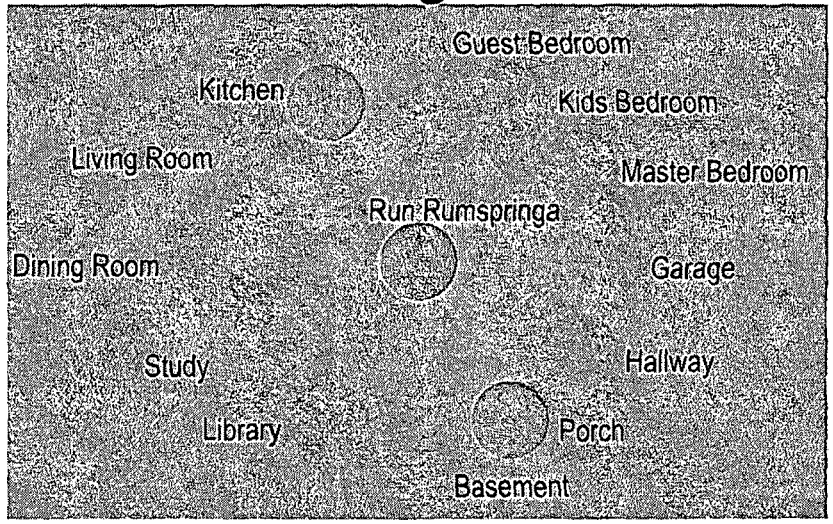
Figure 5C:
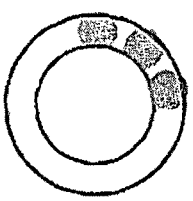

It is pointed out that the first user interface typically is more complex than indicated in FIG. 5c. For example, in some embodiments a further indicator, which typically is called an icon, is displayed on the first user interface, the icon representing adjustment of bass sound. Holding a first left hand finger on the blurred line and a further left hand finger on the bass icon while performing the circular gesture with the right hand finger on the second user interface would change the bass intensity for the subgroup represented by the blurred lines. Similarly, the treble, equalizer function or room compensation can be adjusted.

For example, the touch screen display comprises a pressure sensitive surface and the apparatus is configured for providing a user access to a first mode of operation if the pressure of a finger touching the surface is below a predetermined pressure level and access to a second mode of operation if the pressure is above the predetermined level.

Optionally, the second mode of operation as compared to the first mode of operation comprises more detailed information about multimedia or about the electronic device or different adjustment possibilities of the device or both.

The invention claimed is:

1. An apparatus for controlling a plurality of loudspeakers located in various rooms of a dwelling, where each of the various rooms comprises an electronic device with at least one loudspeaker and with a wireless transceiver, wherein the electronic devices are wirelessly connected to the apparatus for exchange of digital wireless signals, the signals comprising digital command data for start and stop of playing of the loudspeakers, as well as control data for audio levels and status data for connectivity and play status; the apparatus comprising a terminal with a panel (1) that comprises a first user interface (2) and a second user interface (3) arranged side by side; wherein the first user interface (2) comprises an interactive touch screen display with a surrounding border that confines the touch screen display for interactivity by contact with a user's first finger within the border; the touch screen display comprising first indicators (11), wherein each of the first indicators (11) indicates a specific room that contains one of the electronic devices that are wirelessly connected to the apparatus; wherein the second user interface (3) is provided outside the border and comprises an adjustment element configured for adjusting the audio level in such a specific room in response to a correspondingly pointer moving action on the second user interface by a second finger only when in combination with a simultaneous pointer holding action by the first finger on a corresponding first indicator on the first user interface; and wherein the first user interface (2) is configured for grouping the first indicators (11) into user-selected subgroups as a result of pointer actions by a user's finger on the first user interface (2) and configured for providing corresponding subgroup indicators (12a, 12b, 12c), wherein each subgroup indicator (12a, 12b, 12c) reflects such user-selected subgroup; the terminal being configured for changing the volume levels of all the electronic devices in the user-selected subgroup simultaneously in response to the pointer moving action by a second finger on the second user interface (3) only when in combination with a simultaneous pointer holding action by the first finger on the corresponding subgroup indicator (12a, 12b, 12c).

2. An apparatus according to claim 1, wherein the second interface (3) is made of a different material than the surface of the first interface.

3. An apparatus according to claim 2, wherein the surface of the second user interface (3) appears as being made of wood or metal.

4. An apparatus according to claim 1, wherein the adjustment element comprises a track indicator (8) on surface of the second user interface (3), the track indicator indicating a track along which the second finger has to slide on the second user interface in order to adjust the audio level, wherein a sensor is provided in or under the track indicator and configured for sensing the touch and the movement of a finger on the track indicator.

5. An apparatus according to claim 4, wherein the track indicator (8) is a circular hollow in the surface of the second user interface.

6. An apparatus according to claim 1, wherein the first user interface (2) but not the second user interface (3) has an alphanumeric interactive display.

7. An apparatus according to claim 1, wherein the subgroup indicator (12a, 12b, 12c) is provided as a visual element connecting a plurality of first indicators (11) in the display screen of the first user interface (2); wherein the terminal is configured for adjusting the audio volume for the single electronic device in the subgroup or for the entire subgroup selectively in response to the simultaneous pointer holding action by the first finger either on the corresponding first indicator (11) or on the subgroup indicator (12a, 12b, 12c).

8. An apparatus according to claim 1, wherein the touch screen display comprises a pressure sensitive surface and the apparatus is configured for providing a user access to a first mode of operation if the pressure of a finger touching the surface is below a predetermined pressure level and access to a second mode of operation if the pressure is above the predetermined level.

9. An apparatus according to claim 8, wherein the second mode of operation as compared to the first mode of operation comprises more detailed information about multimedia or about the electronic device or different adjustment possibilities of the device or both.

* * * * *